United States Patent Office 3,409,452
Patented Nov. 5, 1968

3,409,452
SET RETARDED PORTLAND CEMENT
Richard Lee Angstadt, Silver Spring, Forrest R. Hurley, Ellicott City, and Charles F. Miller, College Park, Md., assignors to W. R. Grace & Co., New York, N.Y., a corporation of Connecticut
No Drawing. Filed Aug. 9, 1965, Ser. No. 478,460
6 Claims. (Cl. 106—89)

ABSTRACT OF THE DISCLOSURE

A process for retarding the hardening rate of portland cement by adding from 0.1 to 5 weight percent aluminum phosphate to the cement clinker in the process and manufacture.

---

This application relates to a cement composition having a retarded hardening rate and to the method for making this composition.

In summary, the process of this invention is a method for producing a cement mixture having a retarded hardening rate comprising adding to an alite cement from about 0.1 to 5 percent of aluminum phosphate based on the dry weight of the cement binder, and intimately mixing the ingredients to provide a uniform distribution of the aluminum phosphate throughout the cement.

In summary, the process of this invention is a method for retarding the rate of hardening of an alite cement comprising mixing water, an alite cement, and from 0.1 to 5 percent of an aluminum phosphate, based on the dry weight of the cement binder, and allowing the mixture to harden.

In summary, the composition of this invention is an alite cement containing from about 0.1 to 5 percent of an aluminum phosphate, based on the dry weight of the cement binder.

In many of the uses of alite cement of which portland cement, and mortars and concretes containing portland cement are the most common examples it is desirable to retard the rate of hardening thereof. The retardation gained using aluminum phosphate is useful in placing portland cement mortar and concretes in hot weather when ambient conditions tend to accelerate the hardening rate. In general, under both hot and cold ambient conditions, the use of an aluminum phosphate retarder will effect an extension of the time available for mixing and placing such materials. In the process for cementing oil wells, the cement must remain sufficiently fluid to be pumped into the well without the use of high pump pressures and agitation of partially set cements.

A wide variety of inorganic and organic compounds have been found to be active retarders of alite cement hardening. However, most of the retarders are relatively expensive and are water-soluble.

It is one object of this invention to provide a method for retarding the hardening rate of alite cements with an insoluble, inexpensive retarder.

It is another object of this invention to provide alite cements having a retarded rate of hardening obtained with an insoluble, inexpensive retarder.

The binder in the cements, mortars, and concretes used widely as a construction material is portland cement. Portland cement is manufactured by calcining a mixture of limestone and clay to form a clinker, and by grinding the clinker to a fine powder. The major compounds found in portland cement are tricalcium silicate, dicalcium silicate, tricalcium aluminate, and tetracalcium aluminoferrite. The tricalcium and dicalcium silicates are thought to be the principal bonding constituents in the portland cement. Tricalcium silicate when mixed with water forms a calcium silicate hydrate known as tobermorite gel and calcium hydroxide. The dicalcium silicate when contacted with water forms a similar product but at a much lower rate of reaction. The tricalcium silicate, having the greater rate of reaction determines, to a large extent, the hardening rate of the cement. To provide materials which are suitable for different uses, portland cements having a range of hardening rates have been found desirable. By producing cements having a range of proportions of tricalcium silicate present, a range of hardening rates has been obtained. Four general types of portland cements varying principally in the relative quantities of tricalcium silicate and dicalcium silicate present therein, are commonly produced. The proportions of principal compounds present in each type of cement are shown in Table I.

TABLE I

| Cement Type | I | II | III | IV |
|---|---|---|---|---|
| Composition, weight percent: | | | | |
| Tricalcium silicate | 53 | 47 | 58 | 26 |
| Dicalcium silicate | 24 | 32 | 16 | 54 |
| Tricalcium aluminate | 8 | 3 | 8 | 2 |
| Tetracalcium aluminoferrite | 8 | 12 | 8 | 12 |

The term "alite cement" is defined as including neat pastes, mortars, and concretes and the mixed, dry, unreacted ingredients of neat pastes, mortars, and concretes, comprising an alite cement binder, a composition containing greater than 20 percent tricalcium silicate based on the dry weight of the composition. The most common alite cements are portland cements, and mortars and concretes containing portland cements. Most commercially available alite cements contain binders comprising from about 20 to 75 percent tricalcium silicate. The alite cement binder or cement binder is the component which provides the desired bonding, for example portland cement.

A wide range of the hardening rates can be obtained by producing cements having varying quantities of tricalcium silicate such as are shown in Table I. However, the particular proportion of the cement ingredients and the rate of hardening obtained is limited by the types of raw materials from which the cement is produced. As a result, for some uses even the Type IV cement does not harden at a desired slow rate.

Retarders are employed to meet these requirements. Retarders are compositions which have been found to decrease the initial rate of hardening of a cement.

Aluminum phosphates, both pure and impure forms, have been found to be superior alite cement hardening retarders. Previously known cement hardening retarders were water-soluble, and water solubility was thought to be a requisite characteristic of a retarder. Unexpectedly, aluminum phosphates are excellent retarders even though they are substantially insoluble in water. Retardation of alite cements can be obtained with from about 0.1 to 5 percent aluminum phosphate in the cement. Preferably, from about 1 to 2 percent aluminum phosphate is employed. The aluminum phosphate is preferably finely divided, i.e., will pass through a 50 mesh screen (N.B.S.). Little additional retardation is obtained using quantities of aluminum phosphates above the one percent level. This provides a safety factor if a possibility of over dosage is present. Quantities of aluminum phosphates in excess of 5 percent provide premature stiffening. Such high levels are, however, seldom needed. These concentrations are expressed as percent of the dry weight of the cement binder.

The aluminum phosphates can be added to the alite cement by various techniques. Preferably, the aluminum phosphates are added to the alite cement binder clinker prior to grinding, and the components can be ground concurrently and be thoroughly mixed during the grinding step. The aluminum phosphates can also be added to the alite cement as a preground dry powder or water slurry of such a powder, and the ingredients can be thoroughly mixed to uniformly disperse the active ingredients.

Our invention is further illustrated by the following specific, but non-limiting examples.

Example 1

Purified aluminum phosphate (chemical grade) was interground with a Type I portland cement at the 1.0% and 2.0% level, based on the weight of the cement. The time of set was determined. The ASTM Standard Method of Test for Time of Setting of Hydraulic Cement by the Vicat Needle (ASTM C109–58) was followed. A 0.35 water to cement ratio was used. At least three tests were made in each instance. The results are shown in Table A.

TABLE A

| Additive: | Time of set |
| --- | --- |
| Blank | 4 hrs. 45 min. |
| 1.0% $AlPO_4$ | 9 hrs. 9 min. |
| 2.0% $AlPO_4$ | 9 hrs. 15 min. |

Example 2

A variscite ore (crude $AlPO_4 \cdot 2H_2O$ containing 3.85% $Fe_2O_3$ and 34.8% $Al_2O_3$) was interground with four different portland cements. Variscite in quantities of 1.0% by weight of portland cement was added in each case. The time of set was determined following the ASTM Standard Method using the vicat needle. The times of set for both the blanks and for the aluminum phosphate interground materials are listed in Table B. The water to cement ratio was 0.35. Two determinations were made in each case.

TABLE B

| Cement and additive: | Time of set |
| --- | --- |
| Cement A, blank | 4 hrs. 40 min. |
| Cement A, 1.0% variscite | 7 hrs. 25 min. |
| Cement B, blank | 4 hrs. 50 min. |
| Cement B, 1.0% variscite | 9 hrs. 35 min. |
| Cement C, blank | 4 hrs. 50 min. |
| Cement C, 1.0% variscite | 8 hrs. 45 min. |
| Cement D, blank | 5 hrs. 0 min. |
| Cement D, 1.0% variscite | 8 hrs. 40 min. |

Example 3

Both variscite ore and an $AlPO_4$ waste material obtained from the float-zone upgrading of phosphate rock were interground with a Type I portland cement. One percent quantities of these $AlPO_4$ materials were added in each case. The time of set was determined following the ASTM Standard Method using the vicat needle. The water to cement ratio was 0.40. Three determinations were made in each case. The results are shown in Table C.

TABLE C

| Additive: | Time of set |
| --- | --- |
| Blank | 4 hrs. 55 min. |
| 1.0% variscite | 7 hrs. 30 min. |
| 1.0% $AlPO_4$ waste | 6 hrs. 30 min. |

Obviously, many modifications and variations of the invention as hereinabove set forth may be made without departing from the essence and scope thereof, and only such limitations should be applied as are indicated in the appended claims.

We claim:

1. A process for producing a cement mixture having a retarded hardening rate comprising,
   (a) adding to a portland cement from about 0.1 to 5% of an aluminum phosphate based on the dry weight of the cement binder, and
   (b) thoroughly mixing the components of the mixture.

2. A process for producing a cement mixture having a retarded hardening rate comprising,
   (a) mixing from about 0.1 to 5% of an aluminum phosphate with a portland cement binder clinker, and
   (b) grinding the mixture to form a fine particle size, homogeneous cement.

3. A process for producing a cement mixture having a retarded hardening rate comprising,
   (a) adding water and aluminum phosphate to a portland cement, the amount of aluminum phosphate added being from about 0.1 to 5% of the dry weight of the cement binder, and
   (b) thoroughly mixing the components of the mixture.

4. A process for retarding the hardening rate of a portland cement comprising,
   (a) adding to a portland cement from about 0.1 to 5% of an aluminum phosphate based on the dry weight of the cement binder,
   (b) mixing the components to form a homogeneous mixture, and
   (c) adding the water to the mixture.

5. A process for retarding the hardening rate of a portland cement comprising,
   (a) mixing from about 0.1 to 5% of an aluminum phosphate with a portland cement clinker,
   (b) grinding the mixture to form a fine particle size, homogeneous cement, and
   (c) adding water to the mixture.

6. A cement composition consisting essentially of a portland cement and from about 0.1 to 5% of an aluminum phosphate based on the dry weight of the portland cement binder.

References Cited

UNITED STATES PATENTS 2,233,973   3/1941   Dunn _____ 106—89

JAMES E. POER, *Primary Examiner.*